United States Patent

Collins, Jr.

[11] Patent Number: 5,114,043
[45] Date of Patent: May 19, 1992

[54] AEROSOL CAN EMPTYING DEVICE

[76] Inventor: Elia E. Collins, Jr., 1065 W. Lomita Blvd., #10, Harbor City, Calif. 90710

[21] Appl. No.: 594,032

[22] Filed: Oct. 9, 1990

[51] Int. Cl.⁵ .................. B65B 31/00; B67B 7/24
[52] U.S. Cl. .................... 222/86; 414/412; 141/65
[58] Field of Search .................... 222/80-83, 222/83.5, 85, 86, 87, 397; 414/412; 141/51, 65, 66

[56] References Cited

U.S. PATENT DOCUMENTS

| | | | |
|---|---|---|---|
| 3,303,968 | 2/1967 | Compére | 222/83.5 X |
| 3,333,735 | 8/1967 | Odasso | 222/83.5 X |
| 3,358,883 | 12/1967 | Loe | 222/86 |
| 3,438,548 | 4/1969 | Leyba | 222/80 |
| 3,834,589 | 9/1974 | Morane et al. | 222/80 |
| 3,926,340 | 12/1975 | Tygenhof | 222/83.5 |
| 4,319,697 | 3/1982 | DeBarth | 222/80 |
| 4,349,054 | 9/1982 | Chipman et al. | 222/87 X |
| 4,407,341 | 10/1983 | Feldt et al. | 222/87 X |
| 4,459,906 | 7/1984 | Cound et al. | 222/87 X |
| 4,500,015 | 2/1985 | Penney | 222/87 X |
| 4,580,700 | 4/1986 | Rush | 222/87 X |
| 4,690,180 | 9/1987 | Gold | 141/65 X |
| 4,944,333 | 7/1990 | Gold et al. | 222/83.5 X |

FOREIGN PATENT DOCUMENTS 1607991 10/1970 Fed. Rep. of Germany ........ 141/65

Primary Examiner—Michael S. Huppert
Assistant Examiner—Kenneth DeRosa
Attorney, Agent, or Firm—Edgar W. Averill, Jr.

[57] ABSTRACT

A device for emptying pressurized liquid-containing aerosol cans. A closed storage drum has an aerosol can-containing chamber held adjacently to it. An aerosol can may be placed in the chamber, the chamber closed and a piercing pin passed through a low point of the aerosol can. The contents pass outwardly from the can and from the chamber into the storage drum. Preferably, a vapor filter is positioned on the drum so that any vapors passing out of the drum are absorbed by the filter. The system can remove 98% of the aerosol can contents. The process of using the device is also described.

15 Claims, 2 Drawing Sheets

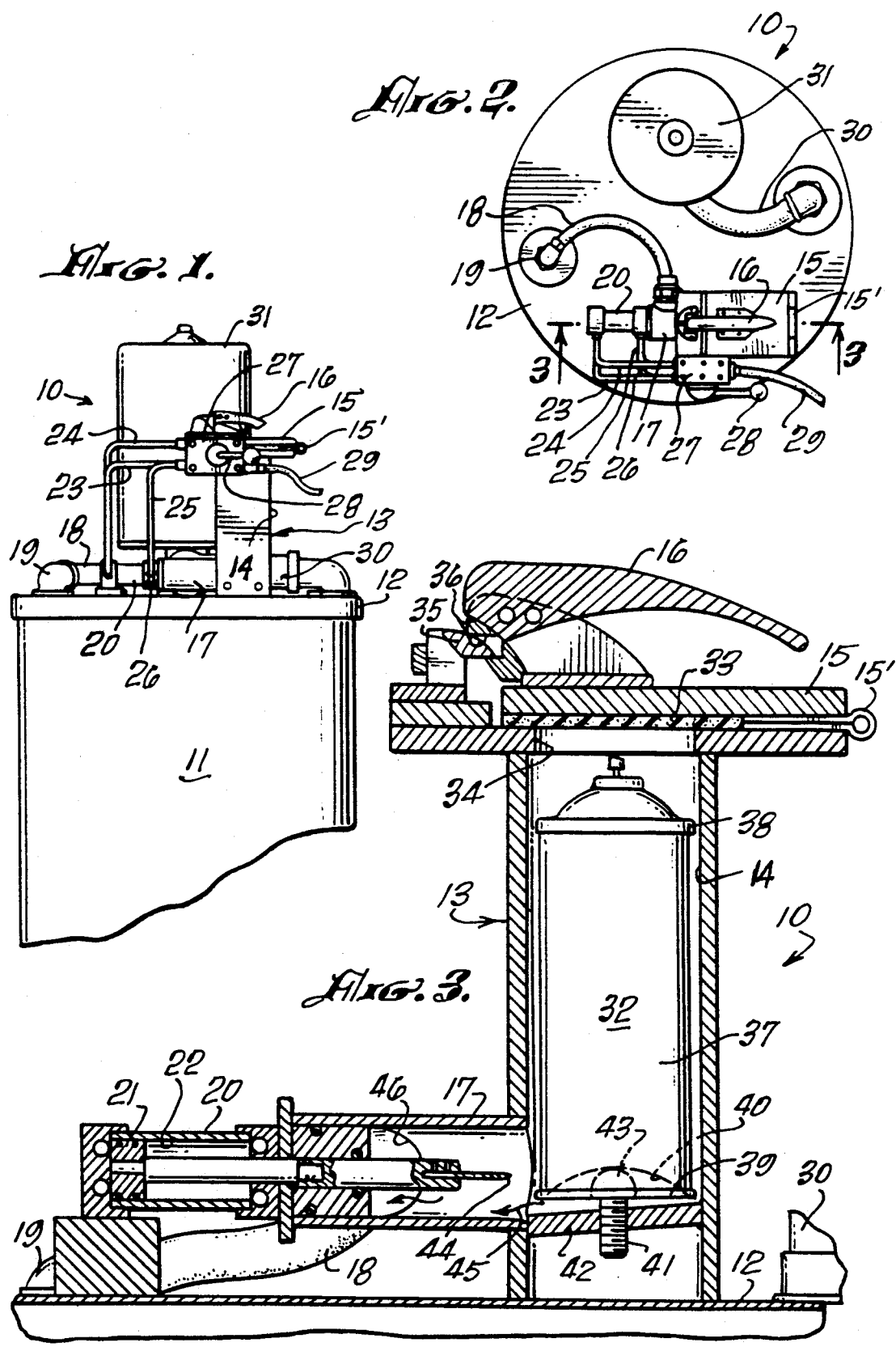

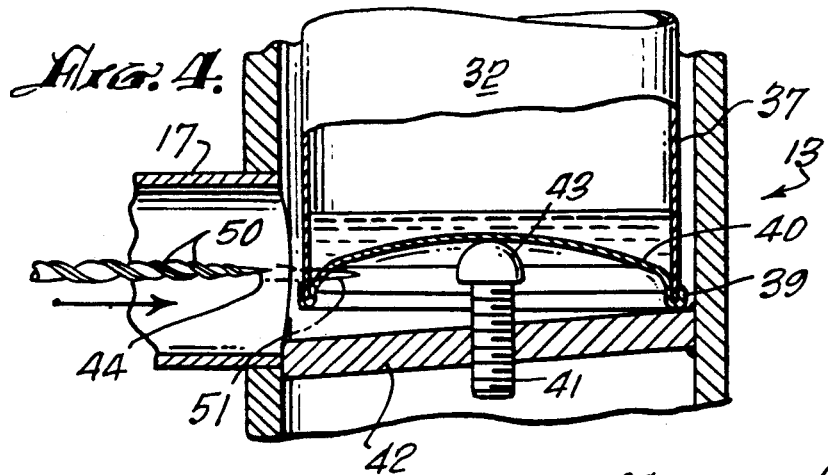
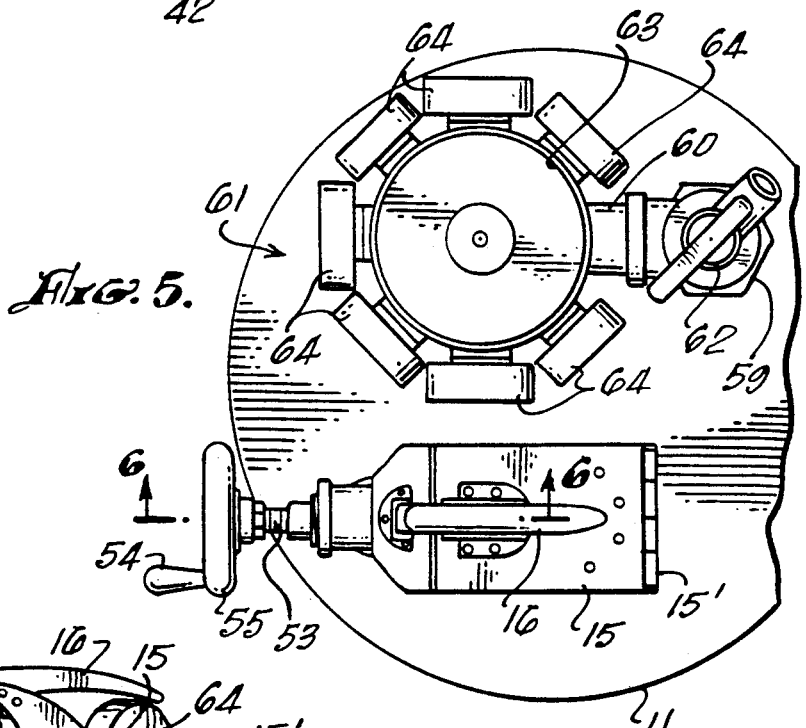
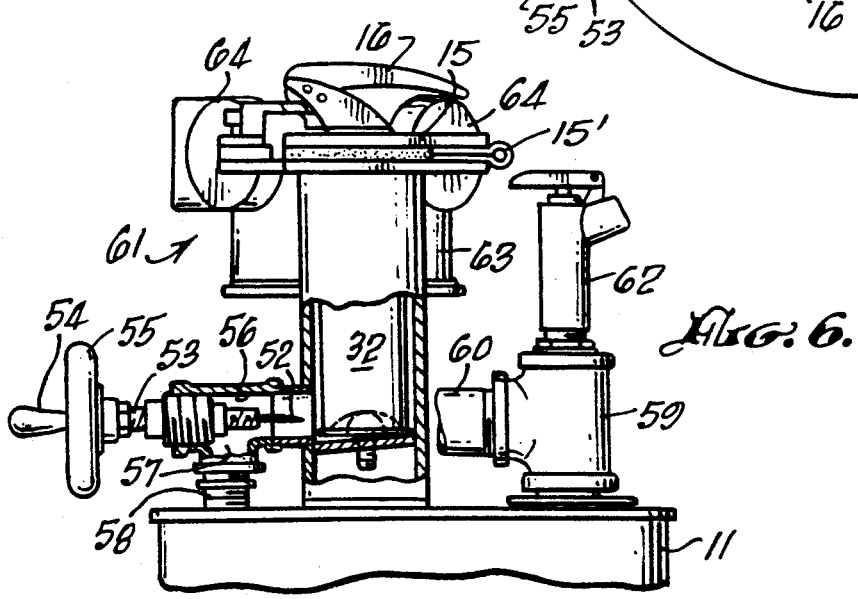

AEROSOL CAN EMPTYING DEVICE

BACKGROUND OF THE INVENTION

The field of the disclosure is waste disposal and recycling, and the invention relates more particularly to the disposal of the contents of partially used aerosol cans.

A significant source of ground water contamination arises from the disposal of partially used aerosol cans in a landfill. As the cans are either crushed by the weight of the landfill or corroded by the time and elements, the contents of the can, which are typically freely liquid, pass outwardly from the can and can easily be leached into the ground water.

Some industries use a large number of aerosol cans such as utility companies for marking on roadways and other surfaces. Also, in the filling of aerosol cans, improperly filled cans must be disposed of as must any other cans which, for one reason or another, are found to be below specifications.

An aerosol can disposing device is shown in U.S. Pat. No. 4,459,906 which pierces the aerosol can axially and crushes the can passing its contents into a pressure vessel which has an exit for liquid at the bottom and gas at the top. Because of the necessity of providing a hydraulic press for the crushing of the can, such systems are bulky and expensive. A less expensive and more compact system would be useful to a far wider variety of potential users and would go far to reduce potential ground water contamination.

SUMMARY OF THE INVENTION

The present invention is for a device for emptying pressurized liquid-containing aerosol cans or other vessels. The device has a closed drum which comprises a storage vessel. An aerosol can-holding chamber may be closed after an aerosol can is placed therein. A piercing pin is movable through the wall of the aerosol can near the low point thereof, and the aerosol portion of the can forces any liquid and unused aerosol out of the can. Such contents then pass from the chamber into the closed drum. Preferably, a vapor filter is positioned so that the drum contents can be maintained at atmospheric pressure which removes any undesirable vapors. The process for using the device of the present invention comprises the steps of placing an aerosol-containing can into a chamber positioned adjacent a storage receptacle and having a liquid passageway leading from the chamber into the storage receptacle. The chamber is closed, and the aerosol can is pierced near the low point thereof, and the contents pass rapidly out through the pierced hole and into the storage receptacle.

BRIEF DESCRIPTION OF THE DRAWINGS

FIG. 1 is a side view partially cut away of the device for emptying pressurized aerosol cans of the present invention.

FIG. 2 is a top view thereof.

FIG. 3 is an enlarged cross-sectional view taken along line 3—3 of FIG. 2.

FIG. 4 is an enlarged cross-sectional view showing the lower portion of the chamber and piercing pin of the device of FIG. 1.

FIG. 5 is a plan view of an alternate configuration of the device of FIG. 1.

FIG. 6 is a side view partially in cross-section taken along line 6—6 of FIG. 5.

DESCRIPTION OF THE PREFERRED EMBODIMENTS

The device for emptying pressurized liquid-containing aerosol cans or other vessels is shown in side view in FIG. 1 and indicated generally by reference character 10. Device 10 has a storage drum 11 which is covered with a removable lid 12. A closable chamber 13 has a chamber portion 14 and a closable cover 15 with a handle 16.

A pin-containing chamber 17 is affixed at one end to chamber portion 14 and has a liquid and vapor line 18 leading therefrom through a fitting 19 into storage drum 11. An air cylinder 20 contains a piston 21 shown in FIG. 3 which moves within the cylinder board 22 of air cylinder 20. Air inlet and outlet lines 23, 24, 25 and 26 lead from air cylinder 20 to control valve 27. Control valve 27 has a valve handle 28 which when moved downwardly causes piston 21 to move toward chamber 14 as described in more detail below. Air, at preferably about 100 psi, is fed into control valve 27 through air hose 29.

As seen best in FIG. 2, once the liquid has passed through liquid and vapor line 18, which is preferably a steel reinforced hose such as a $\frac{3}{4}''$ hose, the vapor formed from the vaporizing aerosol passes first into storage drum 11 and outwardly therefrom through flexible vapor hose 30 into an air filter 31. Air filter 31 is preferably a vapor-absorbing filter such as an activated charcoal filter. The liquid portion of the aerosol can, of course, remains in storage drum 11 for reuse or other disposal techniques.

Referring now to FIG. 3, the particular steps in the operation will be described. An aerosol can 32 is placed in chamber portion 14 of closable chamber 13. The cover 15 is then closed, and a seal 33 forms an airtight seal at the top of opening 34. Cover 15 has a hinge 15. Handle 16 is part of an explosion-proof latch which has a latch portion 35 and a hasp portion 36.

Aerosol can 32 has a cylindrical side wall 37 which has a top rim 38, a bottom rim 39 and an inwardly domed bottom 40. An adjusting screw 41 is held by a slanted bottom 42 and is threadably adjustable so that its top 43 abuts the undersurface of inwardly domed bottom 40 to hold the can in a position so that the piercing tip 44 will pierce the can just above the bottom rim 9. The slanted bottom 42 is slanted so that liquid will pass in the direction of arrow 45 into pin-containing chamber 17 and out through liquid and vapor line 18 which has an opening 46 from pin-containing chamber 17.

Once the aerosol can 32 has been closed in chamber 14, handle 28 is moved introducing air through line 23 and forcing piston 21 to drive piercing tip 44 through the cylindrical side wall 37 and preferably, also, through bottom 40 of aerosol can 32. The pin is then withdrawn by the release of handle 28, and the liquid and any remaining aerosol is quickly forced out of the aerosol can 32 into chamber 17 and out through liquid and vapor line 18 into storage drum 11. Any vapors then pass outwardly from storage drum 11 through flexible vapor hose 30 and through air filter 31. Alternatively, the vapors can be passed to a remote vapor treating process.

Piercing tip 44 preferably has longitudinal grooves shown best in FIG. 4 of the drawings and indicated by reference character 50. These grooves are shown as spiral grooves in FIG. 4 and assist in relieving the pressure in the can as soon as possible As shown in phantom line 51, the piercing tip 44 passes through the inwardly domed bottom 40 so that there are actually two liquid exit ports formed in the preferred configuration of the present invention. It has been found by the placement of the pierced opening, as shown in FIG. 4, that at least 98% of the contents of the can are quickly expelled therefrom. Thus, the can can be disposed of without any damage to the environment. The piercing operation is carried out in a manner to be completely safe to the operator since the can is retained in a heavy walled chamber 14, and the chamber is quickly returned to atmospheric pressure by its connection through liquid and vapor line 18 and flexible vapor hose 30. Thus, when the cover 15 is opened, there is no significant tendency for any escape of vapor or liquid from chamber 14.

An alternate configuration of the can piercer is shown in FIGS. 5 and 6 of the drawings where a mechanically driven piercing pin 52 is held at the end of a threaded screw 53 which has a handle 54 affixed to a wheel 55. Pin 52 is also held within a chamber 56 which has an exit port 57 which is connected to a pipe 58 which leads into the interior of storage drum 11. Drum 11 also supports a set of fittings including tee 59 which permits the passage of vapors either through line 60 to a filter apparatus 61 or through a brass drum faucet 62. Drum faucet 62 provides one method of emptying the liquid contents of drum 11 when desired. Drum 11 can be tilted to its side and drum faucet 62 opened for draining.

Filter 61 has a central manifold 63 through which charcoal filters 64 are threadably affixed. In use, the aerosol can 32 is placed in chamber 14 with pin 52 in its retracted position as shown in FIG. 6. Cover 15 is closed and then handle 54 is turned to drive pin 52 through the side and preferably the domed bottom of can 32. Handle 54 is then turned in the opposite direction to return pin 52 to its retracted position as shown in FIG. 6. The liquid and any vapor in can 32 then passes outwardly through the opening formed by pin 52 through chamber 56 and out of exit port 57 through pipe 58 into drum 11. The vapor then passes upwardly through tee 59, line 60 and into filter apparatus 61 by which the undesirable vapors are removed.

The draining of the can is very rapid, and in the case of the hand-operated unit, is completely empty before the pin has been fully withdrawn to the position shown in FIG. 6. It has been found that a far more efficient can emptying system is formed by the nonaxial piercing of the aerosol can by forming an opening in the side of the can and near the bottom rim. Removable of more than 98% of the contents is achieved. Because of the domed bottom of most aerosol cans, the piercing of the bottom of the can along the can's central axis does not remove a sufficient amount of the can contents. It has also been found that although just the side wall can be pierced, that a quicker emptying is brought about when both the side wall and the bottom is pierced.

The apparatus and process of the present invention provides an inexpensive and efficient method of emptying aerosol cans so that their contents will not contaminate ground water. The device completely removes all pressurized contents and at least 98% of all of the contents. The pierced can then can be safely thrown away. The filters are periodically replaced as needed, and the piercing pin can be periodically sharpened as needed. It has been found that the use of a carbide drill which has been ground to a point, as shown best in FIG. 4, will provide a durable and long lasting piercing means. In order to use smaller aerosol cans, the chamber 14 can be temporarily sleeved so that the can can be retained in an upright position.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A device for emptying pressurized, liquid-containing aerosol cans or other vessels, comprising:

closed drum means forming a closed storage vessel having vessel walls including vessel sides and a cover;

aerosol can-holding means held by said vessel walls, said can-holding means comprising an aerosol can chamber having chamber side walls, a bottom, and a closable cover; a movable piercing pin including a tip movable into a position adjacent the bottom of the aerosol can chamber; and a liquid passageway leading from said aerosol can chamber to said closed drum means;

means for moving said movable piercing pin from a contracted position to a piercing position which pin moving means is not axially aligned with said aerosol can; and an aerosol can within said aerosol can chamber, said aerosol can being of the type having an inwardly domed bottom affixed a bottom rim and having a cylindrical side wall terminating at the bottom rim and wherein said movable piercing pin is movable to a position so that the tip thereof passes through the side wall of the aerosol can and through the inwardly domed bottom.

2. The device for emptying pressurized liquid containing aerosol cans of claim 1 wherein said piercing pin is straight, having a longitudinal axis and moves along its longitudinal axis and is positioned so that its longitudinal axis is at a right angle to the side wall of said aerosol can.

3. The device for emptying pressurized liquid-containing aerosol cans of claim 1 wherein said piercing pin has generally longitudinal grooves to assist in the passage of liquid out of the interior of aerosol cans.

4. The device for emptying pressurized liquid-containing aerosol cans of claim 3 wherein said grooves are spiral grooves.

5. The device for emptying pressurized liquid-containing aerosol cans of claim I further including vapor exit means affixed to said closed drum means to enable vapors from within said drum means to be directed to a predetermined area.

6. The device for emptying pressurized liquid-containing aerosol cans of claim 5 further including vapor filter means affixed to said vapor exit means.

7. The device for emptying pressurized liquid-containing aerosol cans of claim 1 wherein said means for moving said movable piercing pin is hydraulic.

8. The device for emptying pressurized liquid-containing aerosol cans of claim 7 wherein said hydraulic means is air pressure.

9. The device for emptying pressurized liquid-containing aerosol cans of claim 1 wherein said means for moving said movable piercing pin is mechanical.

10. A device for emptying pressurized, liquid-containing aerosol cans or other vessels, comprising:
- an aerosol can having a side wall and an inwardly domed bottom;
- a closed drum having a generally cylindrical side wall and a drum lid forming a closed storage vessel;
- aerosol can-holding means held by said drum lid, said can-holding means comprising an aerosol can chamber holding said aerosol can and having chamber side walls, a bottom, and a closable cover; a movable piercing pin including a tip movable from a retractable position into a piercing position adjacent the low point of the aerosol can and through the side wall and the inwardly domed bottom of said aerosol can; and a liquid passageway leading from said aerosol can chamber to said closed drum;
- a vapor exit passageway held by said drum lid; and
- means for moving said movable piercing pin from a contracted position to a piercing position.

11. The device for emptying pressurized liquid-containing aerosol cans of claim 10 further including a vapor filter affixed in said vapor exit passageway whereby vapors passing out of said drum will pass through said vapor passageway and through said vapor filter means.

12. The device for emptying pressurized liquid-containing aerosol cans of claim 10 wherein said aerosol can chamber bottom is angled toward said movable piercing pin.

13. The device for emptying pressurized liquid-containing aerosol cans of claim 12 wherein said aerosol can chamber bottom includes an adjustable can support pin.

14. A device for emptying pressurized, liquid-containing aerosol cans or the vessels, comprising:
- a closed drum having a generally cylindrical side wall and a drum lid forming a closed storage vessel;
- aerosol can-holding means held by said drum lid, said canholding means comprising a cylindrical aerosol can chamber having chamber side walls, a bottom, and a hinged, closable cover; a movable piercing pin including a tip movable into a position adjacent the bottom of the aerosol can chamber, and a liquid passageway leading from said aerosol can chamber to said closed drum;
- a vapor exit passageway held by said drum lid;
- vapor filter means comprising a plurality of cylindrical filters affixed to a cylindrical manifold, said vapor filter means being held by said drum lid and affixed about said vapor exit passageway; and
- means for moving said movable piercing pin from a contracted position to a piercing position.

15. A process for transferring the contents of an aerosol-containing can of the type having a cylindrical sidewall, a bottom rim and an inwardly domed bottom adjacent the bottom rim and transferring its contents to a storage receptacle comprising the steps of:
- placing said aerosol-containing can into a chamber positioned adjacent a storage receptacle and having a liquid passageway leading from the chamber into the storage receptacle;
- closing the chamber to prevent the escape of liquid or vapor to any place other than the storage receptacle; and
- piercing the cylindrical sidewall adjacent the bottom rim and the domed bottom of the aerosol can whereby the aerosol within the can forces any contents within the can out of the chamber through the liquid passageway into the storage receptacle.

* * * * *